(12) United States Patent
Hashimoto

(10) Patent No.: US 6,814,398 B2
(45) Date of Patent: Nov. 9, 2004

(54) PARTITION STRUCTURE FOR VEHICLE

(75) Inventor: Takashi Hashimoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/327,095

(22) Filed: Dec. 24, 2002

(65) Prior Publication Data
US 2003/0122401 A1 Jul. 3, 2003

(30) Foreign Application Priority Data
Dec. 27, 2001 (JP) .................................. 2001-397685

(51) Int. Cl.[7] .................................................. B60J 7/00
(52) U.S. Cl. ........................... 296/190.11; 296/24.1; 296/37.15; 296/37.6
(58) Field of Search ................... 296/190.11, 24.1, 296/190.1, 191, 183, 203.02, 203.04, 187.03, 146.09; 244/118.5

(56) References Cited

U.S. PATENT DOCUMENTS

| | | | | |
|---|---|---|---|---|
| 4,480,868 A | * | 11/1984 | Koto | 296/190.11 |
| 4,971,378 A | * | 11/1990 | Setina | 296/24.1 |
| 5,419,299 A | * | 5/1995 | Fukasawa et al. | 123/520 |
| 6,260,916 B1 | * | 7/2001 | Hunt | 296/190.11 |
| 6,276,751 B1 | * | 8/2001 | Ikarashi et al. | 296/190.11 |
| 6,398,284 B1 | * | 6/2002 | Butz et al. | 296/37.15 |
| 6,398,291 B1 | * | 6/2002 | Reusswig et al. | 296/190.11 |
| 6,416,104 B1 | * | 7/2002 | Fisher et al. | 296/190.11 |
| 6,443,518 B1 | * | 9/2002 | Rohl et al. | 296/203.04 |
| 6,447,039 B1 | * | 9/2002 | Song | 296/37.6 |
| 6,450,566 B1 | * | 9/2002 | Hong | 296/190.11 |
| 6,474,725 B2 | * | 11/2002 | Sotiroff et al. | 296/190.11 |
| 6,505,872 B2 | * | 1/2003 | Hong | 296/190.11 |
| 6,513,863 B1 | * | 2/2003 | Renke et al. | 296/190.11 |
| 6,520,562 B2 | * | 2/2003 | Pyo | 296/191.11 |
| 6,550,849 B1 | * | 4/2003 | Dosdall | 296/190.11 |
| 6,575,515 B2 | * | 6/2003 | Hashimoto et al. | 296/190.1 |
| 6,582,012 B1 | * | 6/2003 | Smith | 296/190.11 |
| 2002/0089211 A1 | * | 7/2002 | Duffy | 296/190.11 |
| 2003/0025352 A1 | * | 2/2003 | Duffy | 296/190.11 |
| 2003/0121211 A1 | * | 7/2003 | Hashimoto et al. | 49/490.11 |
| 2003/0122402 A1 | * | 7/2003 | Takahashi | 296/190.11 |

* cited by examiner

Primary Examiner—Kiran Patel
(74) Attorney, Agent, or Firm—Smith, Gambrell & Russell

(57) ABSTRACT

A partition structure for a vehicle is disclosed. The partition structure is mainly composed of a partition panel provided between a passenger compartment and a cargo compartment, hinge mechanisms provided for connecting lower corners of the partition panel with a floor of the passenger and cargo compartments, a lock mechanism for supporting the partition panel in a closed state. The partition panel has a low rigidity energy absorption part provided at a lower center part. By this configuration, the partition panel is prevented from deforming even by the application of load thereto without increasing weight or manufacturing cost.

13 Claims, 11 Drawing Sheets

PARTITION STRUCTURE FOR VEHICLE

BACKGROUND OF THE INVENTION

1. Field of the Invention

The present invention relates to a partition structure for a vehicle wherein a partition panel is provided between a passenger compartment and a cargo compartment for opening and closing the passenger compartment with respect to the cargo compartment.

2. Discussion of the Related Art

A so-called pick-up type vehicle contains a passenger compartment and a cargo compartment as an open space provided behind the passenger compartment. A partition panel separates the passenger compartment from the cargo compartment when the panel is closed. When the partition panel is turned down to open the passenger compartment to the cargo compartment, it is possible to carry longer cargo such as a surfboard.

The partition panel extends in a widthwise direction of the vehicle and is provided on a floor between the passenger compartment and the cargo compartment. Bottom parts of the panel are supported on the floor by hinges, so that the panel pivots from a vertically up-right position to a turned-down position in the passenger compartment. When the partition panel is moved downwardly toward the bottom of the passenger compartment, the passenger compartment is open to the cargo compartment. When the partition panel is raised up, the cargo compartment and the passenger compartment are partitioned, whereby the passenger compartment is closed. Moreover, a lock device composed of a striker and a latch is used for the partition structure. The striker is provided on the partition panel at an upper center part, and a latch is provided on a vehicle body. By engaging the striker with the latch the partition panel is maintained in a closed position.

As mentioned above, a vehicle having the partition panel is convenient and useful since two way use is possible.

However, when an impact load is suddenly applied from the front of the vehicle by collision or the like when the partition panel is closed, cargo carried in the cargo compartment is moved in the front direction by an inertial force. In such case, the cargo may apply an impact load to the partition panel to deform the partition panel, so that the panel is depressed or pushed into the passenger compartment side.

As a countermeasure, it has been considered to increase the rigidity of the partition panel, lock mechanism and hinge mechanism. For this purpose, the thickness of the constituent plate members is increased or the members are reinforced. By this measure, the weight of the partition panel is increased, so that the operational efficiency of the panel is decreased and the total weight of the vehicle is increased. Moreover, the cost for manufacturing such vehicle with the improved rigidity will be increased.

OBJECT AND SUMMARY OF THE INVENTION

It is therefore an object of the present invention to provide a partition structure for a vehicle having an improved safety wherein a partition panel is not easily protruded into a passenger compartment without increasing the weight of the partition panel or without increasing the manufacturing cost, even by the application of an impact load which may be applied by cargo, and a lock mechanism and hinge mechanisms are prevented from being deformed because the impact load is dispersedly transmitted to the entire body of the vehicle thereof, or the partition panel is not easily protruded into the passenger compartment even by the application of an excessively large impact load by the deformation of a less rigid part provided on the partition panel for effectively absorbing the impact energy.

The above object of the present invention is attained by a partition structure for a vehicle having an opening provided between a passenger compartment and a cargo compartment provided behind the passenger compartment, and a floor extending from the passenger compartment to the cargo compartment, comprising a partition panel in a rectangular shape extending in a widthwise direction of the vehicle for opening and do-sing the opening, a pair of hinge mechanisms provided fir connecting lower corners of the partition panel with the floor, the hinge mechanisms supporting the partition panel so as to open and close the opening by raising the partition panel to provide a closed state and by lowering the partition panel to provide an open state and a lock mechanism for supporting the partition panel in the closed state by engagement of an upper part of the partition panel with a vehicle body member, the partition panel having a low rigidity energy absorption part provided at a lower center part of the partition panel.

Another object of the present invention to provide a partition structure for a vehicle wherein an energy absorption part is easily prepared at the center of a partition panel.

The above object of the present invention is attained by the partition structure, wherein the partition panel comprises an outer panel approximately in a rectangular shape filling into the opening, and a lower inner panel extending along a lower edge of the outer panel by being welded to the outer panel, a center part of the lower inner panel with respect to a widthwise direction of the vehicle being omitted from welding.

A further object of the present invention is to provide a partition structure of a vehicle wherein the rigidity of the partition panel is further increased without increasing the weight thereof and an excessively large impact load applied to the partition panel is effectively absorbed by the deformation of the partition panel.

The above object of the present invention is attained by the partition structure, wherein the lower inner panel and the outer panel provide a configuration having a hollow cross section and extending in a widthwise direction.

Still another object of the present invention is to provide a partition structure of a vehicle wherein a partition panel has an improved rigidity without weight increase, an impact load applied to the partition panel can be dispersedly transmitted to an entire body of the vehicle by way of hinge mechanisms and a lock mechanism, and an excessively large impact load applied to the partition panel is effectively absorbed by the deformation of the partition panel.

The above object of the present invention is attained by the partition structure, wherein the partition panel comprises an outer panel approximately in a rectangular shape fitting into the opening, an upper inner panel being connected to an upper edge of the outer panel, the upper inner panel and the outer panel providing a configuration having a hollow cross section and extending in a widthwise direction, a lower inner panel welded the a lower edge of the outer panel to provide a configuration having a hollow cross section and extending in a widthwise direction, the lower inner panel having an unwelded center part, a pair of side inner panels extending along lateral sides of the outer panel lower ends of the side inner panels being connected to the lower inner panel, upper ends of the side inner panels being connected to the upper inner panel, and a center inner panel vertically provided at a center of the outer panel, and an upper end and a lower end of the center inner panel being respectively connected to the upper inner panel and the lower inner panel.

Yet another object of the present invention is to provide a partition structure wherein an impact load applied to the partition panel is effectively transmitted to the floor.

The above object of the present invention is attained by the partition structure, wherein both ends of the lower inner panel are respectively connected to the hinge mechanisms.

A still father object of the present invention is to provide a partition structure wherein an impact load applied to the partition panel by cargo in the cargo compartment in the case of frontal collision, is dispersedly transmitted to a floor via hinge mechanisms, and to the vehicle body members via a lock mechanism, and an excessively large impact load applied to the partition panel in accordance with the forward movement of the partition panel causes a less rigid plate pin supporting part to deform by the transmission of load via a hinge bracket and a hinge pin, impact energy is absorbed by torsional deformation, whereby the intrusion of the partition panel into the passenger compartment is prevented.

The above object of the present invention is attained by a partition structure for a vehicle having an opening provided between a passenger compartment and a cargo compartment provided behind the passenger compartment, and a floor extending from the passenger compartment to the cargo compartment, comprising a partition panel in a rectangular shape extending in a widthwise direction of the vehicle for opening and closing the opening, a pair of hinge mechanisms provided for connecting lower corners of the partition panel with the floor, the hinge mechanisms supporting the partition panel so as to open and close the opening by raising the partition panel to provide a closed state and by lowering the partition panel to provide an open state, and a lock mechanism for supporting the partition panel in the closed state by engagement of an upper part of the partition panel with a vehicle body member, each of the hinge mechanisms comprising a hinge plate having a base plate connected to the floor and a plate pin supporting part raised approximately vertically from the base plate and extending in a lengthwise direction of the vehicle, a hinge bracket having a mounting part connected to the partition panel and a bracket pin supporting part extending from the mounting part and opposing the plate pin supporting part, and a hinge pin extending in a widthwise direction of the vehicle and rotatably connecting the bracket pin supporting part with the plate pin supporting part.

A still farther object of the present invention is to provide a partition structure wherein an impact energy applied to the hinge bracket is effectively transmitted to the plate pin supporting part and the plate pin supporting part absorbs impact energy by torsional distortion.

The above object of the present invention is attained by the partition structure, wherein the plate pin supporting part of the base plate comprises a first pin receiving hole therein, the bracket pin supporting part of the hinge bracket comprising a second pin receiving hole having a diameter smaller than that of the first pin receiving hole, the hinge pin successively having a head with a diameter larger than the first pin receiving hole, a step fitting into the first pin receiving hole so as to rotate therein and a screw part connected to the second pin receiving hole, the head, the step and the screw part being integral with each other, the plate pin supporting part being supported between the head and the bracket pin supporting part, the screw part being connected to the bracket pin supporting part by being inserted into the second pin receiving hole.

A still further object of the present invention is to provide a partition structure wherein an excessively large impact load applied to the partition panel is effectively absorbed by the bending deformation of the partition panel, and hence by the torsional deformation of the plate pin supporting part by the transmission of load via the hinge bracket and the hinge pin.

The above object of the present invention is attained by the partition structure, wherein the partition panel comprises a low rigidity energy absorption part at a lower center part.

A still farther object of the present invention is to provide a partition structure which is rigid without the weight increase wherein an impact load applied to the partition panel is dispersedly transmitted to the entire vehicle body via the hinge mechanism and the lock mechanism, and an excessively large impact load applied to the partition panel is absorbed by the deformation of the partition panel, and hence by the torsional deformation of the plate pin supporting part by the transmission of load via the hinge bracket and the hinge pin.

The above object of the present invention is attained by the partition structure, wherein the partition panel comprises an outer panel approximately in a rectangular shape for opening and closing the opening, an upper inner panel connected to an upper edge of the outer pane, a lower inner panel welded to an lower end of the outer panel providing a configuration having a hollow cross section and extending in a widthwise direction, the lower inner panel having an unwelded center part a pair of side inner panels extending along lateral sides of the outer panel, lower ends of the side inner panels being connected to the lower inner panel, upper ends of the side inner panels being connected to the upper inner panel, and a center inner panel vertically provided at a center of the outer panel, and an upper end and a lower end of the center inner panel being respectively connected to the upper inner panel and the lower inner panel.

A still further object of the present invention is to provide a partition structure wherein a partition panel has an improved rigidity, an impact load applied to the partition panel by cargo in a cargo compartment is dispersedly transmitted to a floor via hinge mechanisms, and to vehicle body members via a lock mechanism, and an excessively large impact load, which may be applied to the partition panel, is eased by being absorbed by the deformation of a striker bracket and an outer panel, so that the intrusion of the partition panel into a passenger compartment is prevented.

The above object of the present invention is attained by a partition structure or a vehicle having an opening provided between a passenger compartment and a cargo compartment provided behind the passenger compartment, and a floor extending from the passenger compartment to the cargo compartment, comprising a partition panel in a rectangular shape extending in a widthwise direction of the vehicle for opening and closing the opening, the partition panel having an outer panel approximately in a rectangular shape fitting into the opening, a paw of hinge mechanisms provided for connecting lower corners of the partition panel with the floor, the hinge mechanisms supporting the partition panel so as to open and close the opening by raising the partition panel to provide a closed stare and by lowering the partition panel to provide an open state, a lock mechanism for supporting the partition panel in the closed state by engagement of an upper part of the partition panel with a vehicle body member, the lock mechanism comprising an outer panel striker installation part extending from an upper end of the outer panel in a front direction, a striker bracket connected to the outer panel, the striker bracket having a base part, a font surface extending from an upper end of the base part with the rising inclination in a forward direction, a bracket striker installation part extending from the upper end of the front surface by being bent in a backward direction, the outer panel striker installation part being superimposed on the striker bracket striker installation part, a striker supported by both the outer panel striker installation part and the striker bracket striker installation part, and a latch being engage able with the striker.

A still further object of the present invention is to provide a partition structure wherein a partition panel has an improved rigidity at the upper part thereof over a vehicle width direction, the supporting rigidity of the striker contained in the lock mechanism is maintained, and an excessively large impact energy applied to the partition panel is effectively absorbed by the deformation of the striker bracket, outer panel and upper inner panels.

The above object of the present invention is attained by the partition structure, wherein the partition panel comprises an upper inner panel, the upper inner panel being welded to an upper edge of the outer panel to provide a configuration having a hollow cross section and extending in a widthwise direction, the outer panel and the base part of the striker bracket being connected with each other via the upper inner panel.

A still further object of the present invention is to provide a partition structure wherein a structure contained in a lock mechanism is rigidly installed, an impact load is dispersedly transmitted to a floor via binge mechanisms, and to the vehicle body members via the lock mechanism, and an excessively large impact load applied to the partition panel is eased by being absorbed by the deformation of a striker bracket, striker reinforcing member and outer panel, so that the intrusion of the partition panel into a passenger compartment is prevented.

The above object of the present invention is attained by a partition structure for a vehicle having an opening provided between a passenger compartment and a cargo compartment provided behind the passenger compartment, and a floor extending from the passenger compartment to the cargo compartment, comprising a partition panel in a rectangular shape extending in a widthwise direction of the vehicle for opening and closing the opening, the partition panel having an outer panel approximately in a rectangular shape fitting into the opening, a pair of hinge mechanisms provided for connecting lower corners of the partition panel with the floor, the hinge mechanisms supporting the partition panel so as to open and close the opening by raising the partition panel to provide a closed state and by lowering the partition panel to provide an open state, a lock mechanism for supporting the partition panel in the closed state by engagement of an upper part of the partition panel with a vehicle body member, the lock mechanism comprising a striker reinforcing member having a reinforce base part connected to the outer panel and a reinforce member striker installation part extending from an upper end of the reinforce base part in a font direction, a striker bracket connected to the outer panel, the striker bracket having a base part, a front surface extending from an upper end of the base part with the rising inclination in a forward direction, and a bracket striker installation part extending from the upper end of the front surface by being bent in a backward direction, the reinforce member striker installation part being superimposed on the striker bracket striker installation part, a striker connected to both the bracket striker installation part and the reinforce member striker installation part, and a latch being engageable with the striker.

A still further object of the present invention is to provide a partition structure wherein the partition panel has an improved rigidity at the upper part thereof over a vehicle width direction, the supporting rigidity of the striker is maintained, and an excessively large impact energy applied to the partition panel is effectively absorbed by the deformation of the striker bracket, striker reinforcing member and upper inner panels.

The above object of the present invention is attained by the partition structure, wherein the partition panel comprises an upper inner panel, the upper inner panel welded to an upper edge of the outer panel to provide a configuration having a hollow cross section and extending in a widthwise direction, the reinforce base part of the striker reinforcing member and the base part of the striker bracket being connected with each other via the upper inner panel.

A still further object of the present invention is to provide a partition structure wherein a striker contained in a lock mechanism is a rigidly installed, an impact load is effectively dispersed to a floor via hinge mechanisms, and to the vehicle body members via the lock mechanism, and an excessively large impact load applied to the partition panel is effectively absorbed by the deformation of a striker bracket, striker reinforcing member and an outer panel, so that the intrusion of the partition panel into a passenger compartment is prevented.

The above object of the present invention is attained by a partition structure for a vehicle having an opening provided between a passenger compartment and a cargo compartment provided behind the passenger compartment, and a floor extending from the passenger compartment to the cargo compartment, comprising a partition panel in a rectangular shape extending in a widthwise direction of the vehicle for opening and closing the opening, the partition panel having an outer panel approximately in a rectangular shape fitting into the opening, a pair of hinge mechanisms provided for connecting lower corners of the partition panel with the floor, the hinge mechanisms supporting the partition panel so as to open and close the opening by raising the partition panel to provide a closed state and by lowering the partition panel to provide an open state, a lock mechanism for supporting the partition panel in the closed state by engagement of an upper part of the partition panel with a vehicle body member, the lock mechanism comprising an outer panel striker installation part extending from an upper end of the outer panel into a front direction, a striker reinforcing member having a reinforce base part connected to the outer panel and a reinforce member striker installation part extending from an upper end of the reinforce base part in a front direction, the reinforce member striker installation part being superimposed on the outer panel striker installation part, a striker bracket connected to the outer panel, the striker bracket having a base part, a front surface extending from an upper end of the base part with a rising inclination in a forward direction, and a bracket striker installation part extending from the upper end of the front surface by being bent in a backward direction, the bracket striker installation part being superimposed on the outer panel striker installation part and reinforce member striker installation part, providing a superimposed installation part, a striker supported by the superimposed installation part, and a latch being engageable with the striker.

A still further object of the present invention is to provide a partition structure wherein a partition panel has an improved rigidity at the upper part thereof over a vehicle width direction, the supporting rigidity of the striker is maintained, and an excessively large impact energy applied to the partition panel is effectively absorbed by the deformation of the striker bracket, striker reinforcing member, outer panel and upper inner panels.

The above object of the present invention is attained by the partition structure, wherein the partition panel comprises an upper inner panel, the upper inner panel welded to an upper edge of the outer panel to provide a configuration having a hollow cross section and extending in a widthwise direction, the reinforce base part of the striker reinforcing member and the base part of the striker bracket being connected with each other via the upper inner panel.

A still further object of the present invention is to provide a partition structure wherein the partition panel has an improved rigidity without the weight increase, an impact load applied to the partition panel is dispersedly transmitted to the entire body of the vehicle, and an excessively large impact energy applied to the partition panel is effectively absorbed by the deformation of the partition panel, and torsional deformation of the plate pin supporting part by the transmission of load via the hinge bracket and a hinge pin.

The above object of the present invention is attained by the partition structure, wherein the partition panel comprises a lower inner panel, the lower panel welded to a lower edge of the outer panel to provide a configuration having a hollow cross section and extending in a widthwise direction, a pair of side inner panels extending along lateral sides of the outer panel, lower ends of the side inner panels being connected to the lower inner panel, upper ends of the side inner panels being connected to the upper inner panel and a center inner panel vertically provided at a center of the outer panel, an upper end and a lower end of the center inner panel being respectively connected to the upper inner panel and the lower inner panel, each of the hinge mechanisms comprising a hinge plate having a base plate connected to the floor and a plate pin supporting part raised approximately vertically from the base plate and extending in a lengthwise direction of the vehicle, a hinge bracket having a mounting part connected to the lower inner panel and the upper inner panel, and a bracket pin supporting part extending from the mounting part and opposing the plate pin supporting part, and a hinge pin extending in a widthwise direction of the vehicle and rotatably connecting the bracket pin supporting part with the plate pin supporting part.

A still further object of the present invention is to provide a partition structure wherein an impact load is further effectively dispersed to the partition panel, so that impact energy is more effectively absorbed.

The above object of the present invention is attained by the partition structure, wherein the partition panel comprises a center reinforcing member, the center reinforcing member welded to the outer panel to provide a configuration having a hollow cross section and extending in a vertical direction, lower reinforcing members extending in a widthwise direction between the center reinforcing member and the side inner panels having a predetermined distance from the center reinforcing member, the lower reinforcing members and the outer panel providing a configuration having a hollow cross section and extending in a widthwise direction, lower ends of the lower reinforcing members being connected to the lower inner panel, upper reinforcing members extending in a widthwise direction of the vehicle between the center reinforcing member and the side inner panels having a predetermined distance from the center reinforcing member, the upper reinforcing members and the outer panel providing a configuration having a hollow cross section and extending in a widthwise direction, upper ends of the lower reinforcing members being connected to the upper inner panel.

BRIEF DESCRIPTION OF THE DRAWINGS

A more complete appreciation of the invention and many of the attendant advantages thereof will be readily perceived as the same becomes better understood by reference to the following detailed description when considered in connection with the accompanying drawings, wherein.

DETAILED DESCRIPTION OF THE INVENTION

Figure 1:
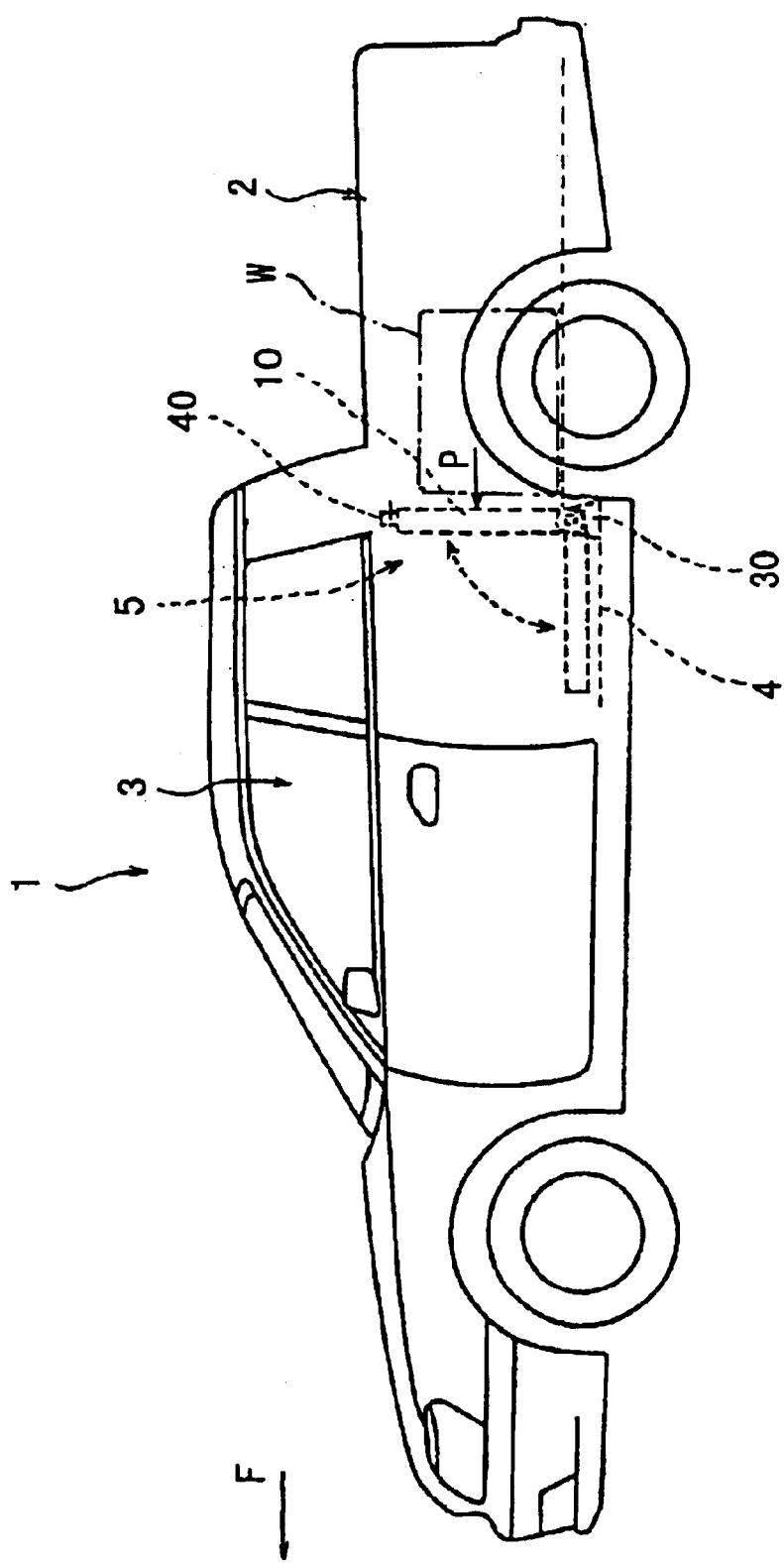
FIG. 1 is a schematic diagram of a vehicle for explaining a partition structure as an embodiment of the present invention.

Other feature of the present invention will become understood in the course of the following description of exemplary embodiments, which are given for illustration of the invention and are not intended to be limiting thereof.

A partition structure of the present invention will be explained by referring to FIGS. 1 to 11. In each of FIG. 1 and FIGS. 3 to 11, an arrow F indicates a front direction with respect to a vehicle. In the figures, the same reference numerals refer to identical members.

FIG. 1 is a schematic diagram for showing a pick-up type vehicle 1. The vehicle 1 has a cargo compartment 2 at the rear part of the vehicle 1 which is open to the environment, and a passenger compartment 3. An opening is provided between the carrier compartment 2 and the passenger compartment 3, and a partition structure 5 opens and closes the opening.

The partition structure 5 comprises a partition panel 10, a pair of hinge mechanisms 30, and a lock mechanism 40, The partition pane as a rectangular shape and is supported on a floor 4 of the vehicle 1 by the hinge mechanism 30. The panel 10 extends in a widthwise direction of the vehicle 1. The panel 10 is supported on the floor 4 of the vehicle 1 so as to pivot on the hinge mechanism 30 provided on bottom ends of the panel 10.

When the partition panel 10 is pivoted downwardly to the bottom of the passenger compartment 3, the passenger compartment 3 opens to the cargo compartment 2. In this situation, it is possible to carry longer cargo such as a surfboard in the vehicle 1 by inserting the cargo into the passenger compartment 3. On the other hand, when the partition panel 10 is pivoted to a raised-up or vertical state, the opening is closed, so that the passenger compartment 3 is partitioned off from the cargo compartment 2. An upper center part of the partition panel 10 is held by a lock mechanism 40 or maintaining the partition panel 10 in a closed state.

The structures of the partition panel 10, the hinge mechanism 30 and the lock mechanism 40 will be explained.

Figure 2:
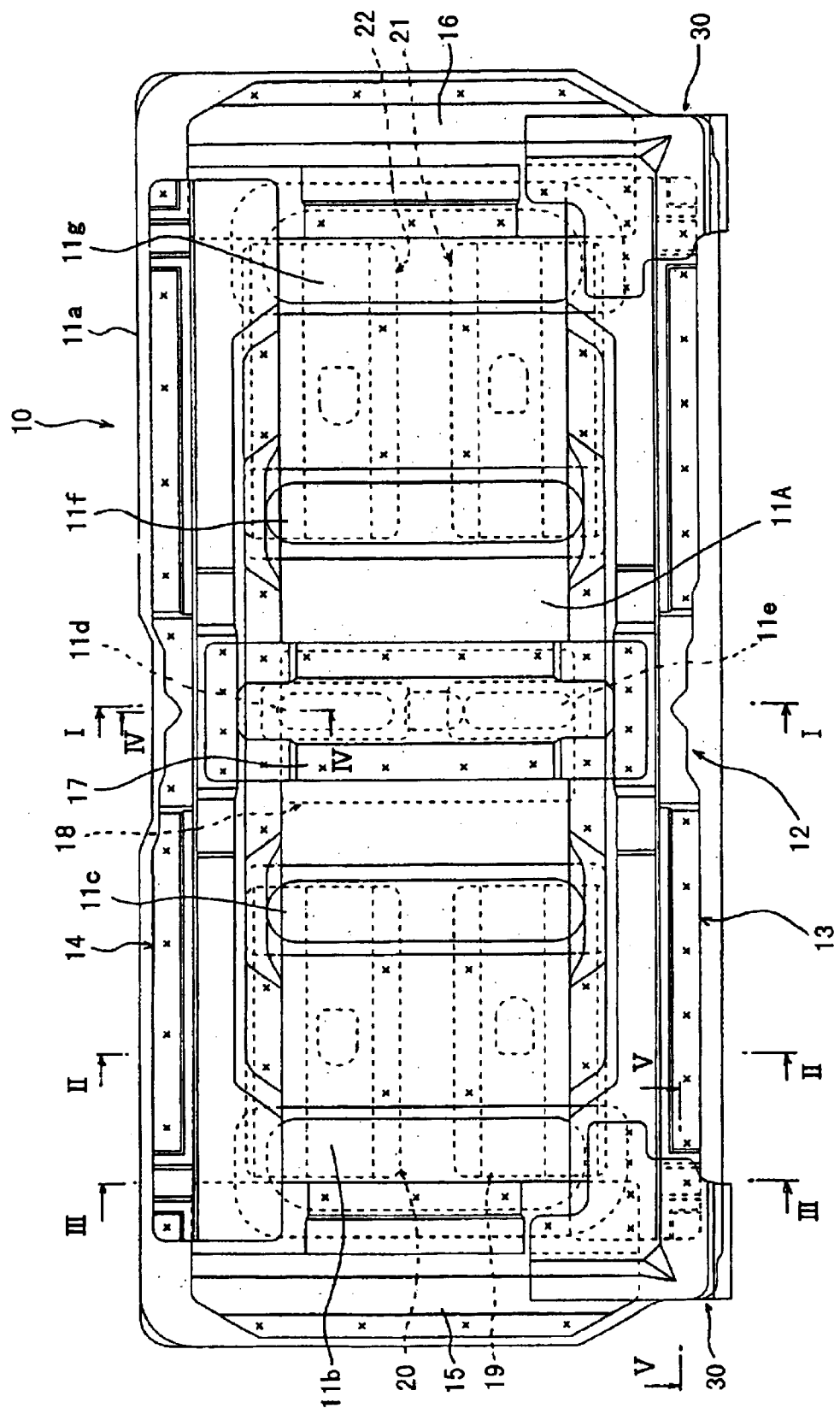
FIG. 2 is a front view for showing a partition panel according to the present invention.
Figure 3:
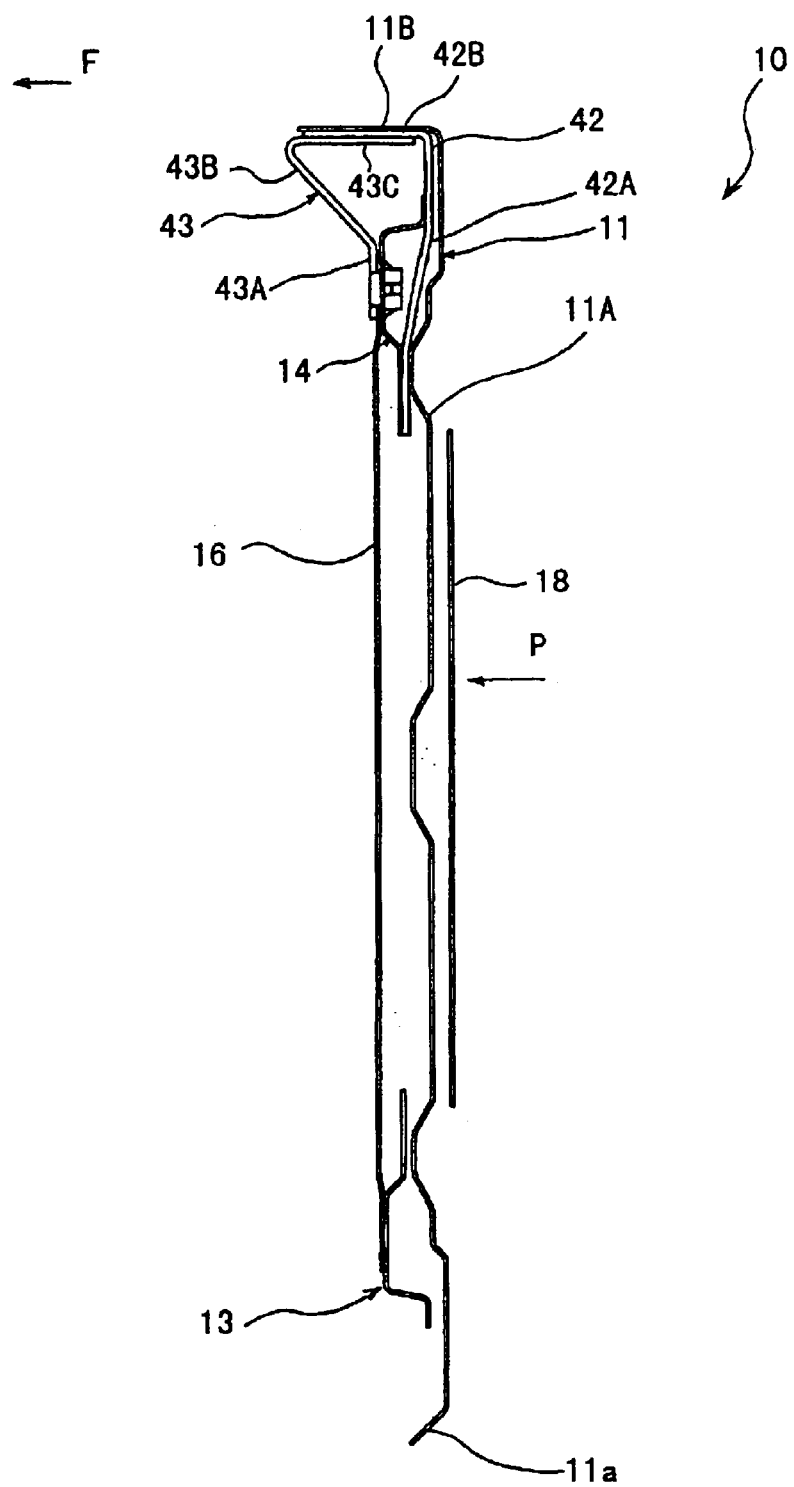
FIG. 3 is a cross section of the partition panel in FIG. 2 obtained by cutting the panel along a line I—I shown in FIG. 2.
Figure 4:
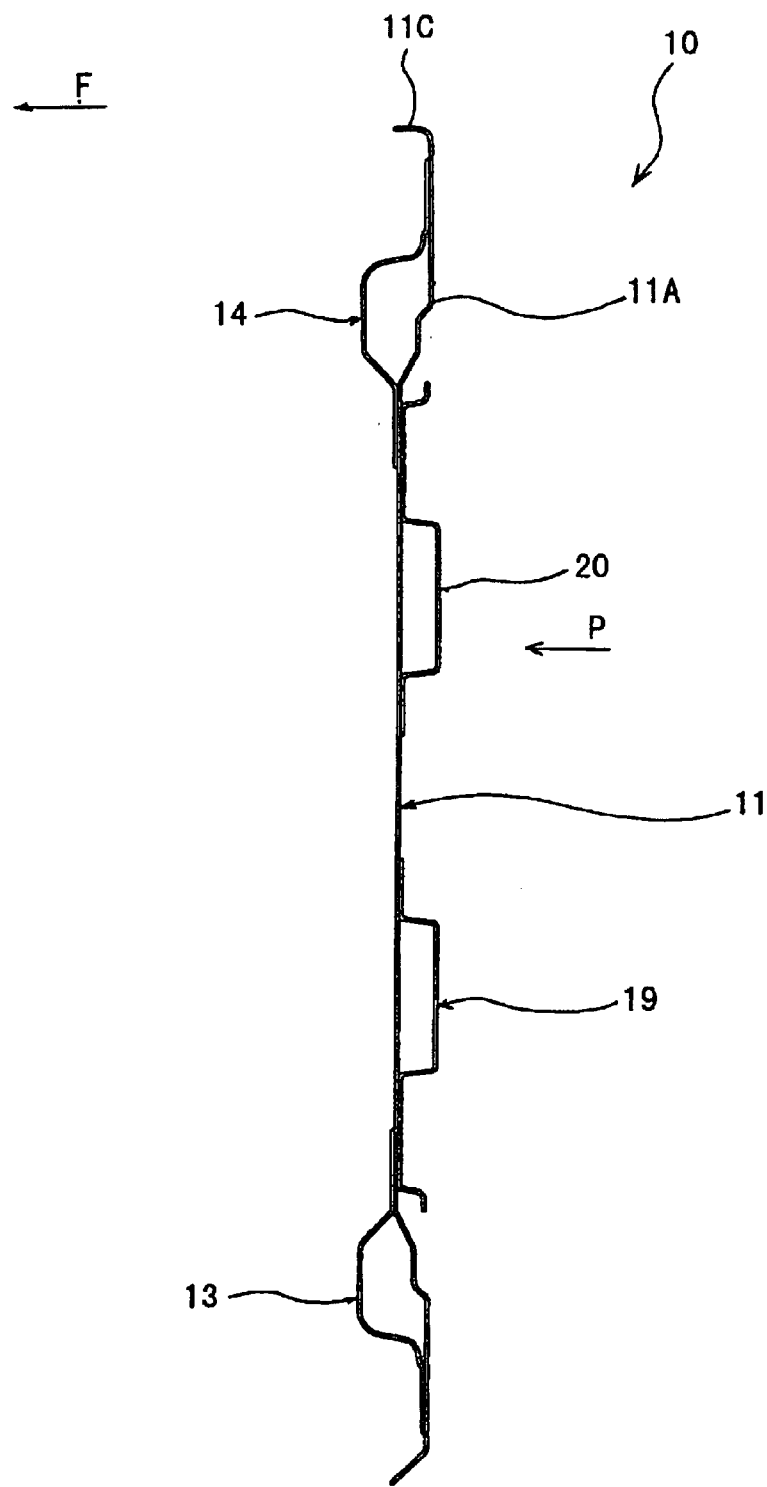
FIG. 4 is a cross section of the partition panel in FIG. 2 obtained by cutting the panel along a line II—II shown in FIG. 2.
Figure 5:
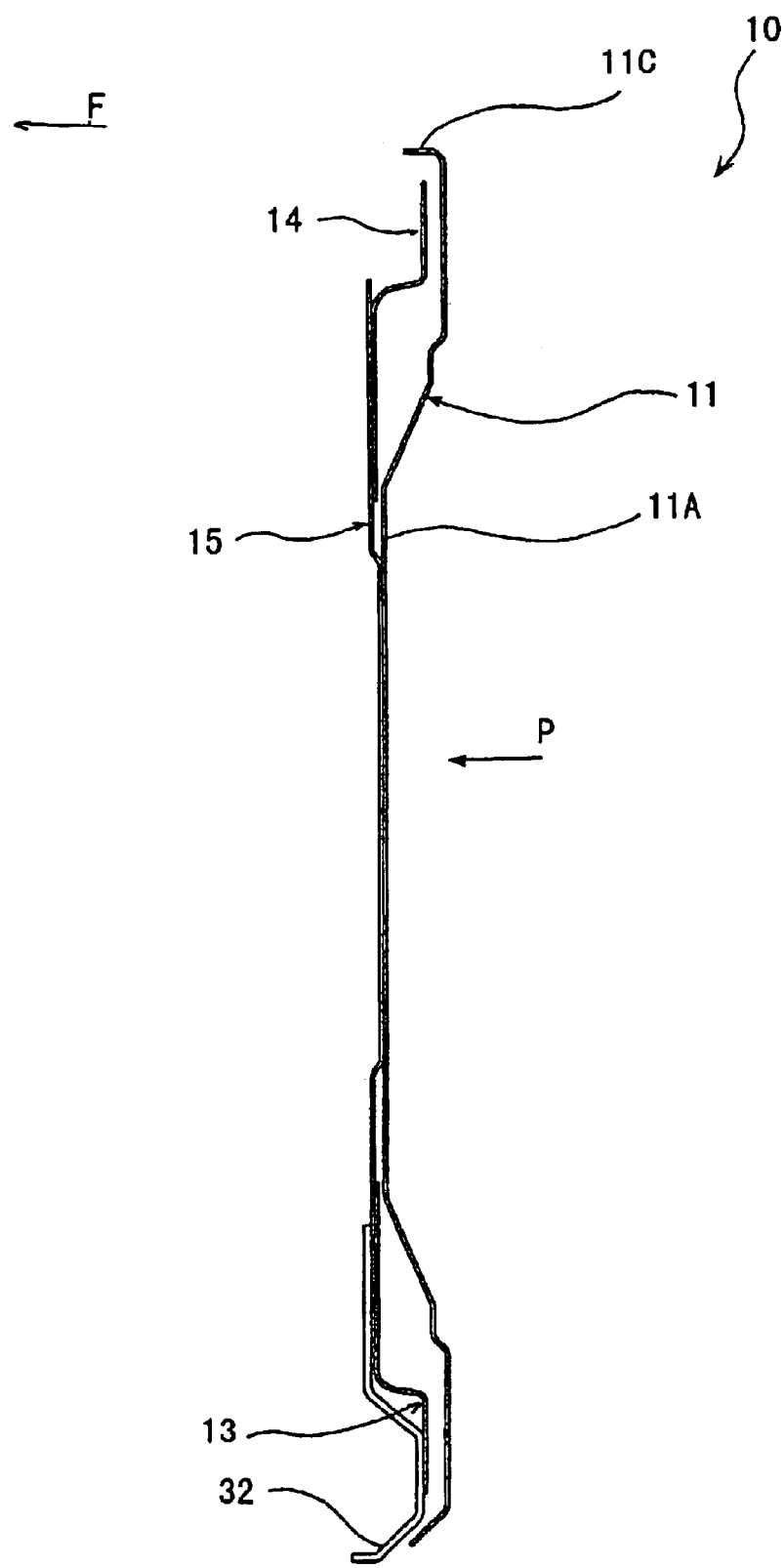
FIG. 5 is a cross section of the partition panel in FIG. 2 obtained by cutting the panel along a line III—III shown in FIG. 2.
Figure 6:
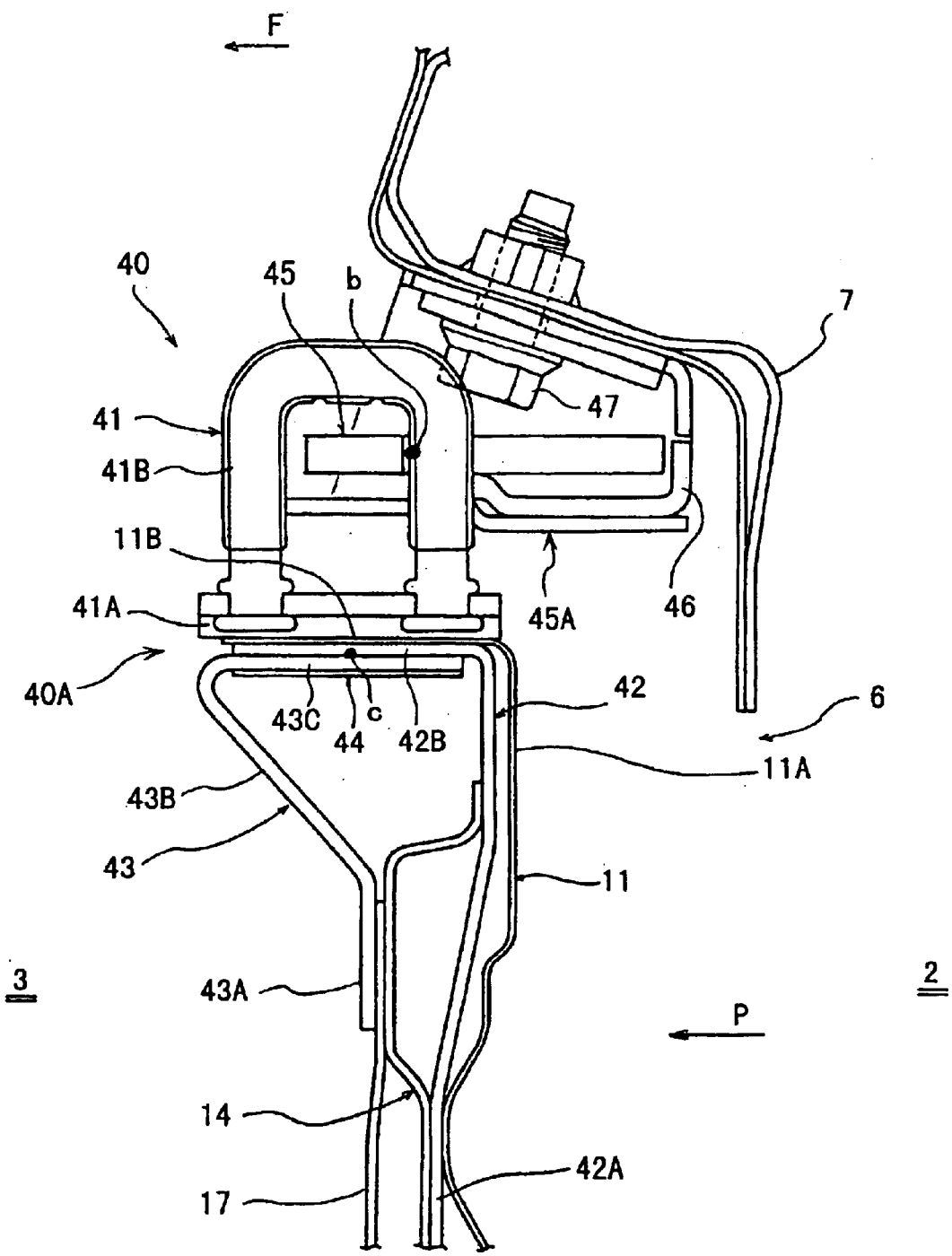
FIG. 6 is a cross section of the partition panel in FIG. 2 and a lock mechanism provided thereon obtained by cutting the panel along a line IV—IV shown in FIG. 2.
Figure 7:
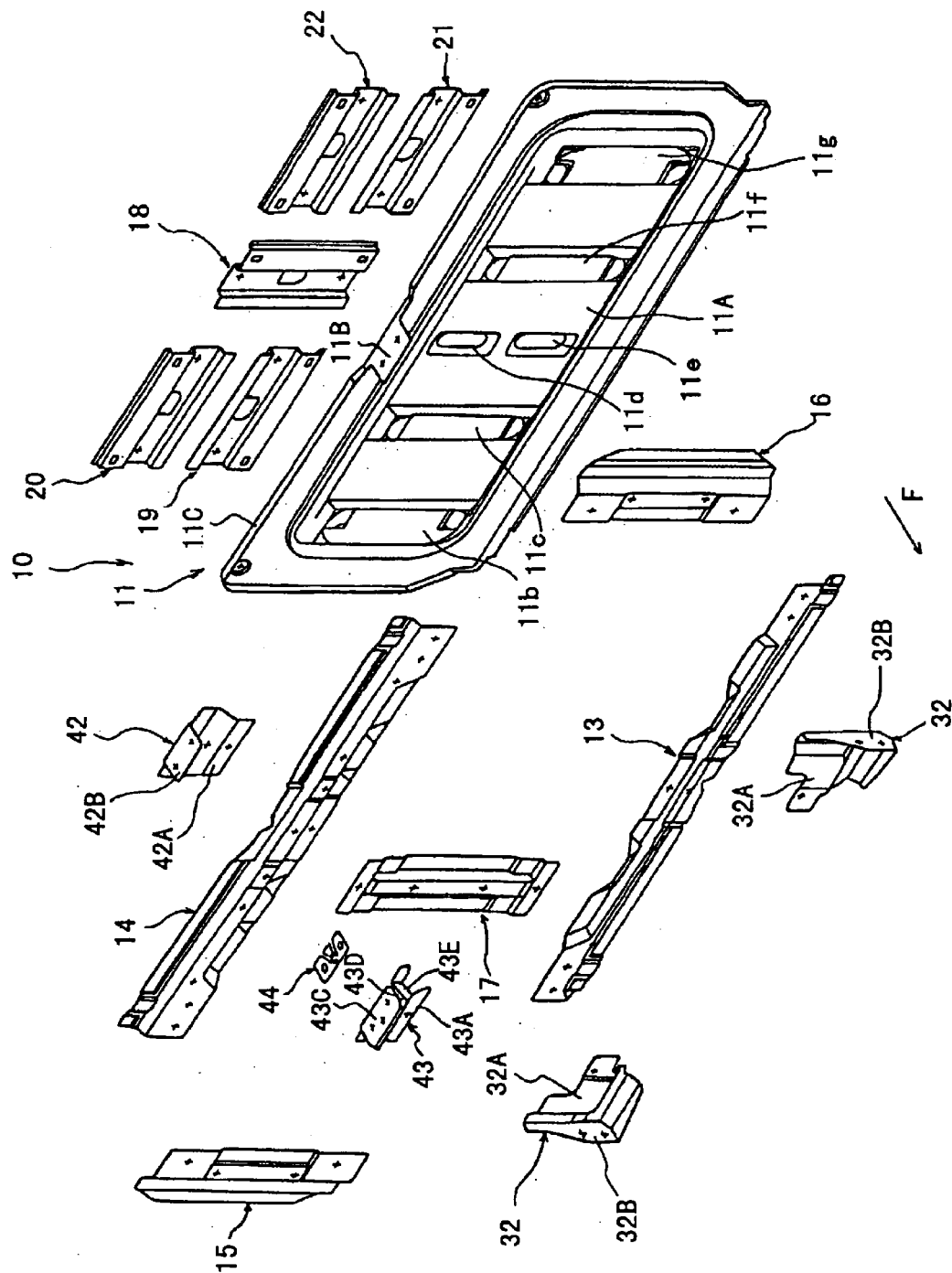
FIG. 7 is a perspective exploded view of a partition panel of the present invention.

FIG. 2 is a front view of a partition panel 10; FIGS. 3, 4 and 5 are cross sections of FIG. 2 cut respectively along lines I—I, II—II and III—III; FIG. 6 is a cross section of FIG. 2 cut along a line IV—IV; and FIG. 7 is an exploded perspective view of the partition panel 10. In the following description, surfaces of the panel 10 on the side of the passenger compartment 3 and the cargo compartment 2, when the panel 10 is closed, are respectively called a front surface and a rear surface.

The partition panel 10 has an approximately rectangular shape having top and bottom sides extending in a width direction of the vehicle 1, and has a size configured for closing and opening the rear part of the passenger compartment.

As can be seen in FIG. 3, the partition panel 10 comprises an outer panel 11 having a panel body 11A and a flange 11C is provided around the periphery of the panel body 11A by bending the outer panel 11 toward a front direction F of the vehicle 1. The outer panel 11 has a striker installation part 11B approximately in a rectangular shape at the upper center part.

As shown in FIG. 2, the panel body 11A is reinforced with a plurality of beads 11b, 11c, 11d, 11e, 11f and 11g extending in a vertical direction.

FIG. 3 shows that a striker reinforcing member 42 having an L-shaped cross section is connected to the outer panel 11 by welding. The striker reinforcing member 42 has a base part 42A at the upper center part and a striker installation part 42B. The base part 42A is superimposed on the panel body 11A, and the striker installation part 42B is superimposed on the lower surface of the striker installation part 11B.

A lower inner panel 13 is configured as shown in FIGS. 2 to 5. The lower inner panel 13 extending in a widthwise direction of the vehicle 1 is attached to the front surface of the outer panel 11 at the lower part. The lower inner panel 13 has a vertical U shaped cross section (FIGS. 3 and 4), and extends horizontally without reaching both of the lower corners of the outer panel 11 (FIG. 2). The lower inner panel 13 is welded to the outer panel 11 except for a center part with respect to the vehicle width. A hollow closed cross section extending in a widthwise direction is formed by the lower inner panel 13 and the outer panel 11 at the lower part of the partition panel 10. The rigidity of the partition panel 10 is maintained by this configuration.

The outer panel 11 and the lower inner panel 13 are welded with each other at a center lower area of the panel 10. In this area, the rigidity of the panel 10 is not increased. Namely, an energy absorption part 12 for absorbing an excessive impact energy is formed by simply omitting the welding at the center lower area of the panel 10.

FIG. 2 shows an upper inner panel 14 extending in a widthwise direction of the vehicle 1. The upper inner panel 14 is attached to the outer panel 11 at the upper part of the front surface. The upper inner panel 14 also has a vertical cross section in a U shape (FIGS. 3 and 4), and extends horizontally without contacting both upper corners of the outer panel 11. The upper inner panel 14 is welded to the outer panel 11 except for a center part with respect to the vehicle width.

A striker reinforcing member 42 is connected to the center part of the upper inner panel 14 as shown in FIG. 3. In this way, the partition panel 10 maintains the rigidity over the entire width at the upper part.

As shown in FIG. 2, side inner panels 15 and 16 are provided on the front side of the outer panel 11 along both lateral sides of the panel 11. The upper ends of the side inner panels 15 and 16 are welded to the ends of the upper inner panel 14, and the lower ends are welded to the ends of the lower inner panel 13. Accordingly, the rigidity of the partition panel 10 on both lateral sides is increased by providing the side inner panels 15 and 16.

Moreover, a center panel 17 is provided on the front side of the outer panel 11 approximately at the center with respect to the vehicle width. The upper end and the lower end of the center inner panel 17 are respectively welded to the upper inner panel 14 and the lower inner panel 13. The center inner panel 17 has a U shaped cross section. The center inner panel 17 and the outer panel 11 from a vertically extending closed space having a hollow cross section. In this way, the center part of the partition panel 10 is vertically reinforced.

As shown in FIGS. 3 and 7, a center reinforcing member 18 with an S-shaped cross section is provided on a rear surface of the outer panel 11. The center reinforcing member 18 extends in a vertical direction and faces the center inner panel 17 via the outer panel 11. The center reinforcing member 18 is welded on the rear surface of the outer panel 11 so as to form a vertically extending closed space having a hollow cross section. In this way, the center part of the partition panel 10 is a further reinforced in a vertical direction.

FIG. 7 is an exploded view of a partition panel 10, showing that a lower reinforcing member 19 and an upper reinforcing member 20 provided on the rear surface of the outer panel 11 extend horizontally of the vehicle in parallel with each other. The lower and upper reinforcing members 19 and 20 are arranged between the center reinforcing member 18 and a side inner panel 15 viewed from the front, and the lower reinforcing member 19 is placed below the upper reinforcing member 20. The lower and upper reinforcing members 19 and 20 are welded to the outer panel 11. Inner ends of the lower and upper reinforcing members 19 and 20 are spaced apart from the center reinforcing member 18 and outer ends of the members 19 and 20 are close to the side inner panel 15. Each of the lower and upper reinforcing members 19 and 20 forms a horizontally extending closed space having a hollow cross section together with the outer panel 11. A lower end of the lower reinforcing member 19 and an upper end of the upper reinforcing member 20 are welded to the outer panel 11 together with the lower and upper inner panels 13 and 14.

Likewise, lower and upper reinforcing members 21 and 22 are arranged between the center reinforcing member 18 and a side inner panel 16, and the lower reinforcing member 21 is placed below the upper reinforcing member 22. The lower and upper reinforcing members 21 and 22 are welded to the outer panel 11. Inner ends of the lower and upper reinforcing members 21 and 22 are spaced apart from the center reinforcing member 18, and the outer ends of the members 21 and 22 are close to the side inner panel 16. Each of the lower and upper reinforcing members 21 and 22 forms a horizontally extending closed space having a hollow cross section together with the outer panel 11. A lower end of the lower reinforcing member 21 and an upper end of the upper reinforcing member 22 are welded to the outer panel 11 together with the lower and upper inner panels 13 and 14.

Moreover, the center reinforcing member 18, the lower reinforcing members 19 and 21, and the upper reinforcing members 20 and 22 serve also as trim board brackets. In other words, a trim board (not shown) is provided on the partition panel 10 via the center reinforcing member 18, the lower reinforcing members 19 and 21, and the upper reinforcing members 20 and 22.

Hinge mechanisms 30 are provided for linking lower corners of the partition panel 10 with the floor 4 for supporting the panel 10 so as to pivot on the hinge mechanisms 30. In FIG. 2, a pair of the hinge mechanisms 30 is symmetrically provided.

Figure 8:
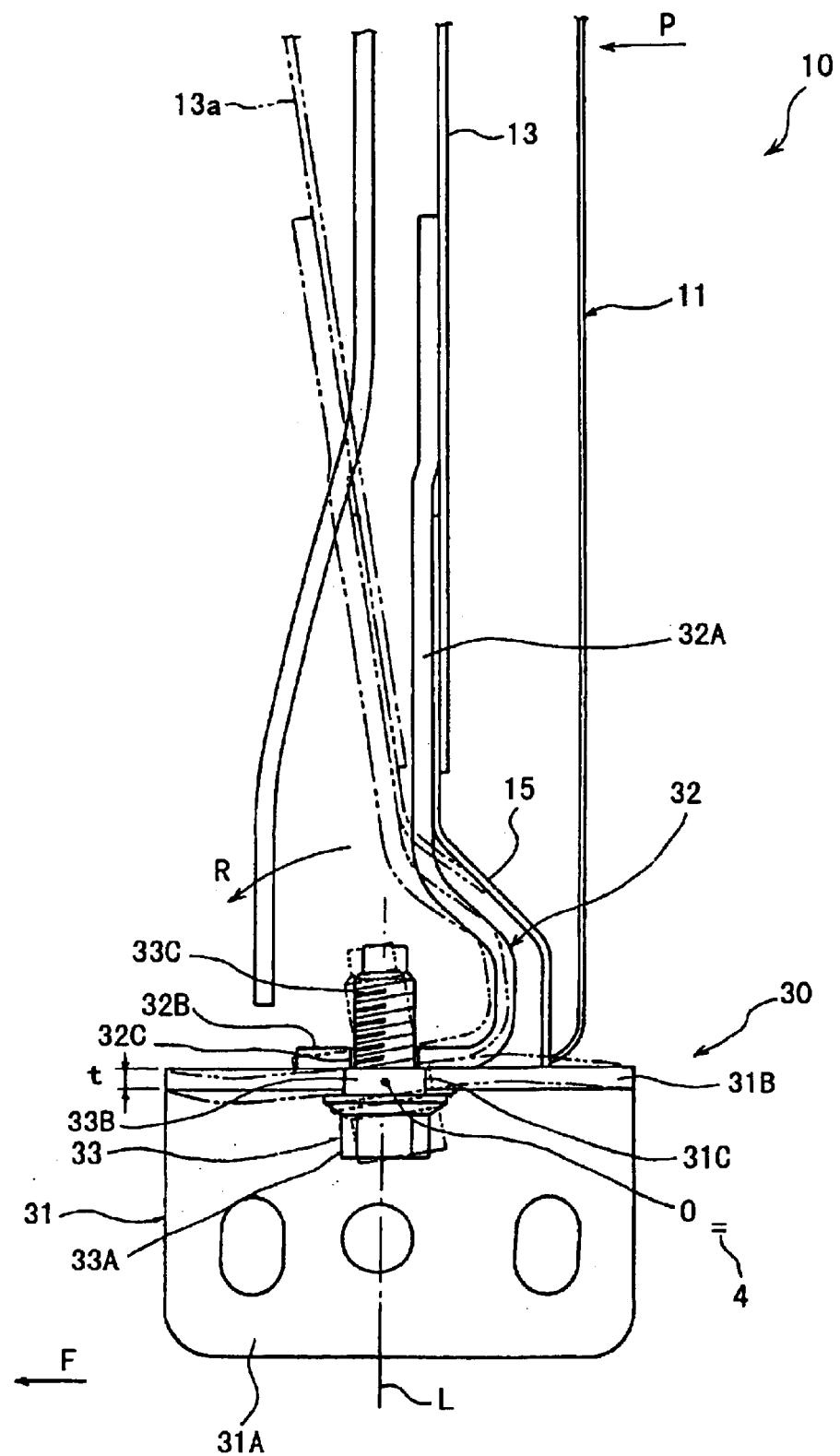
FIG. 8 is a cross section of the partition panel in FIG. 2 and a hinge mechanism provided thereon obtained by cutting the panel with the lock mechanism along a line V—V shown in FIG. 2.
Figure 9:
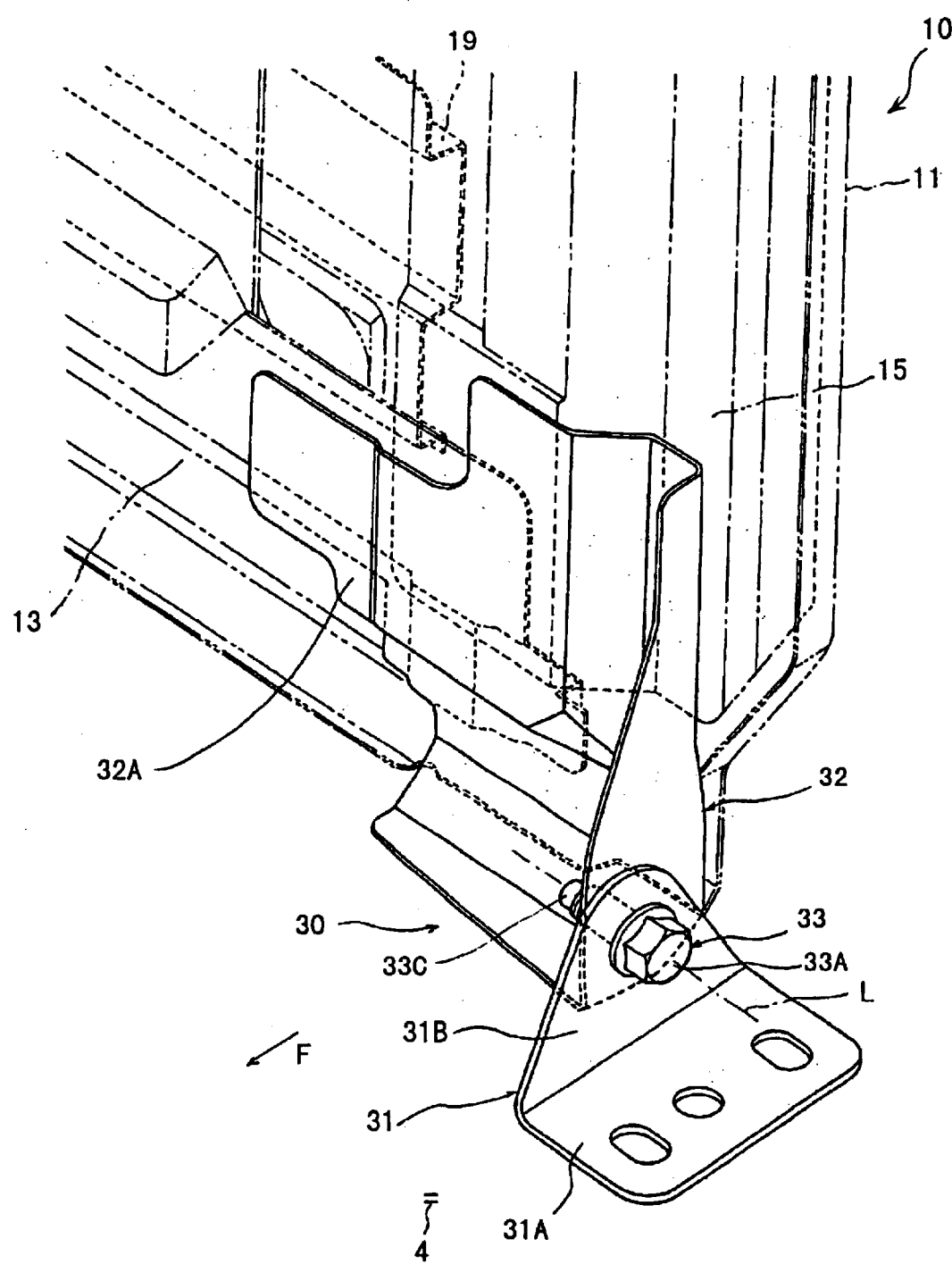
FIG. 9 is a schematic perspective view for explaining a hinge mechanism for use in the present invention.

One of the hinge mechanisms 30 is explained with reference to FIGS. 8 and 9. FIG. 8 is a cross section of FIG. 2 cut along a line V—V, and FIG. 9 is a perspective view for showing an essential part of the hinge mechanism 30. The hinge mechanism 30 comprises a hinge plate 31 attached on a: floor 4, a hinge bracket 32 connected to the partition panel 10, and a hinge pin 33 extending in a widthwise direction of the vehicle 1 for linking the hinge plate 31 and the hinge bracket 32 so as to permit the hinge mechanism pivot.

The hinge plate 31 is a plate member having an L-shaped cross section. The hinge plate 31 is made of a base part 31A in a rectangular shape connected to the floor 4, and a plate pin supporting part 31B. Longer sides of the base part 31A extend in a lengthwise direction of the vehicle, and the plate pin supporting part 31B is approximately in a triangular shape when viewed from the lateral side of the vehicle. The base part 31A is integral with the plate pin supporting part 31B and meets the plate pin supporting part 31B at an approximately right angle. A pin receiving hole 31C is perforated in the plate pin supporting part 31B at an upper part thereof.

The hinge bracket 32 is connected to the partition panel 10 by being superimposed on an end of the lower inner panel 13 and the lower part of the side inner panel 15. The hinge bracket 32 is a plate member having an approximately L-shaped cross section as shown m FIG. 9. The hinge bracket 32 has a lower part, a mounting part 32A, and a bracket pin supporting part 32B. The lower part of the hinge bracket 32 is forwardly bent, the mounting part 32A has a backwardly enlarged outer lateral part, and the bracket pin supporting part 32B is vertically raised up. The outer surface of the bracket pin supporting part 32B faces the inner surface of the plate pin supporting part 311B. A pin receiving hole 32C is perforated on the bracket pin supporting part 32B. The pin receiving hole 32C is prepared as a threaded hole and is coaxial with a pin receiving hole 31C. The diameter of the pin receiving hole 32 is smaller than that of the pin receiving hole 310.

As shown in FIG. 8, a hinge pin 33 has a head 33A having a diameter larger than that of the pin receiving hole 31C, a step 33B which fits in the pin receiving hole 31C so as to freely rotate therein, and a screw part 33C which will be inserted to the pin receiving hole 32C. Namely, the hinge pin 33 is in the shape of a bolt with a step coaxialy with the head 33A, the step 33B and the screw part 33C as an integral body. The thickness of the step 33B is prepared to be slightly larger than a thickness (t) of the bracket pin supporting part 32B of the hinge plate 31.

The screw part 33C of the hinge pin 33 at the bracket pin supporting part 32B is inserted into the pin receiving hole 31C in the hinge plate 31. Then, the step 33B is received in the pin receiving hole 31C and the screw part 33C is fixed to the hinge plate 31 at the pin receiving hole 32C by inserting the hinge pin 33 into the pin receiving hole 32C. Finally, the hinge pin is tightened, so that the hinge bracket 32 is connected to the hinge plate 31 by the hinge pin 33 so as to be pivotable. Thus, the partition panel 10 is supported on the floor 4 by the hinge mechanism 30 and pivots in the lengthwise direction of the vehicle 1.

The bracket pin supporting part 31B of the hinge mechanism 30 is in the shape of a flat plate extending in a lengthwise direction of the vehicle 1 for supporting the stage 33B of the hinge pin 33 so as to pivot. Therefore, the partition panel 10 is supported with a satisfactory rigidity when the panel 10 pivots on a central axle L of the hinge pin 33 from an open state to a closed state or vise versa.

Figure 10:
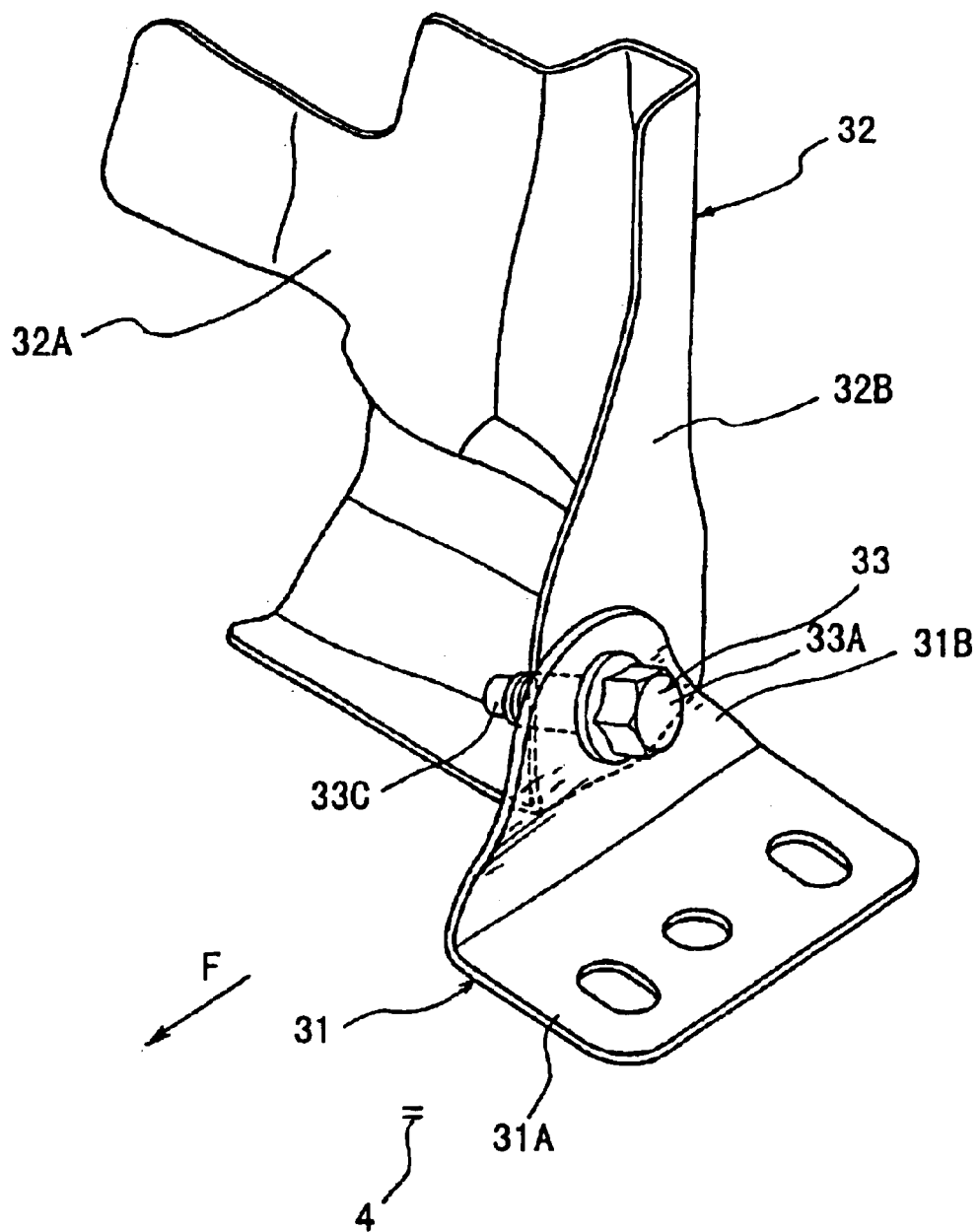
FIG. 10 is a schematic perspective view of a hinge mechanism for use in the present invention when the hinge mechanism is deformed.

When an excessively large impact load is applied to the vehicle 1 in the direction where the top of the hinge pin 33 rotates in the lengthwise direction of the pin 33, the plate pin supporting part 31B having a plate shape is subjected to torsional deformation, and the plate pin supporting part 31B absorbs impact energy (FIG. 10).

In this embodiment, the plate pin supporting part 31B is held between the head 33A and the bracket pin supporting part 32B of the hinge bracket 32 in a relatively wide range by the stage 33B, the hinge pin 33 being received in the pin receiving hole 31C. In this configuration, an impact load is effectively conveyed from the hinge bracket 32 to the plate pin supporting part 316 by the plate pin supporting part 31B being prevented from local deformation and by the plate pin supporting part 31B being subjected to torsion deformation.

A lock mechanism 40 will be explained below by referring to FIG. 6. The lock mechanism 40 is provided at an upper center part of the partition panel 10 and comprises a striker support part 40A for supporting a striker 41 and a latch support part 46A for supporting a latch 45 which engages with the striker 41.

Furthermore, the striker support part 40A comprises the striker installation part 11B of the outer panel 11, the striker reinforcing member 42, a striker bracket 43 and a striker plate 44. As mentioned previously, the striker installation part 11B is an upper central part of the outer panel 11 approximately in a rectangular shape, forwardly bent from the panel body 11A. The striker reinforcing member 42 has an L-shaped cross section having a reinforce base part 42A connected to the upper part of the panel body 11A and a striker installation part 42B forwardly bent extending from the reinforce base part 42A.

As shown in FIGS. 6 and 7, the striker bracket 43 comprises a bracket base surface 43A, a front surface 43B, a striker installation part 43C, reinforcement flanges 43D, and connecting parts 43E. The bracket base surface 43A is an approximately vertical part welded to the center part of the upper inner panel 14 via the top part of the center inner panel 17. The front surface 43B extends from the upper end of the base part 43A with the rising/upward inclination in a forward direction. The striker installation part 43C has a rectangular shape extending horizontally from the upper end of the font surface 43A by being bent in a backward direction. The front surface 43B and the striker installation part 43C make an acute angle. The striker installation part 43C is superimposed on the lower surface of the striker installation part 42B, and the reinforcement flanges 43D vertically extend from the lateral edges of the striker installation part 48C. The connecting parts 43E extend from the lateral edges of the front surface 43B and contact the bracket base surface 42A.

A pair of bolt holes (not shown) is perforated in the outer panel 11, striker reinforcing member 42 and striker bracket 43 which are superimposed with each other at center parts (seen in a lengthwise direction of the vehicle) of the striker installation parts 11B, 42B and 43C.

The striker plate 44 is an approximately rectangular plate provided on a lower surface of the striker installation part 43C. The striker plate 44 also has a pair of bolt holes (not shown) at parts corresponding to the above-mentioned bolt holes, and nuts (not shown) for fixing the striker 41 are applied thereto.

The striker 41 contains an installation base 41A approximately in a rectangular shape provided on the upper surface of the striker installation part 11B, and a striker element 41B has an approximately U shape extending in a lengthwise direction of the vehicle 1 at a center part in a widthwise direction of the vehicle 1. Both ends of the striker element 41B are connected to the installation base 41A at locations near front or rear edges.

The striker has a pair of bolt holes (not shown) at the installation base 41A correspondingly to the above-mentioned striker installation parts 11B, 42B and 43C at a center part in the widthwise direction of the vehicle 1.

As shown in FIG. 6, the striker 41 is provided on the upper center part of the partition panel 10 by inserting bolts into bolt holes of the installation base 41A of the striker 41, the striker installation part 11B of the outer panel 11, the striker installation part 42B of the striker reinforcing member 42, the striker installation part 43C of the striker bracket 43 and the striker plate 44, and fastening the bolts against nuts provided on the striker plate 44.

On the other hand, the latch support part 45A for supporting the latch 45 is attached to a body member 7 forming an opening 6 between the cargo compartment 2 an the passenger compartment 3. The latch support part 45A contains a latch installation base 46 for pivotably supporting the latch 45. When the partition panel 10 pivots from an open state to a closed state, a striker element 41B protrudes into an engaging slot of the latch 45. The latch 45 is pivots to a locked position and holds a front part of the striker member 41B. Therefore, the partition panel 10 is maintained in a closed state. When the latch 45 is operated to have an unlocked position, the striker element 41 is disengaged from the striker element 41B. In this way, the partition panel 10 is allowed to pivot from the closed state to the open state.

Figure 11:
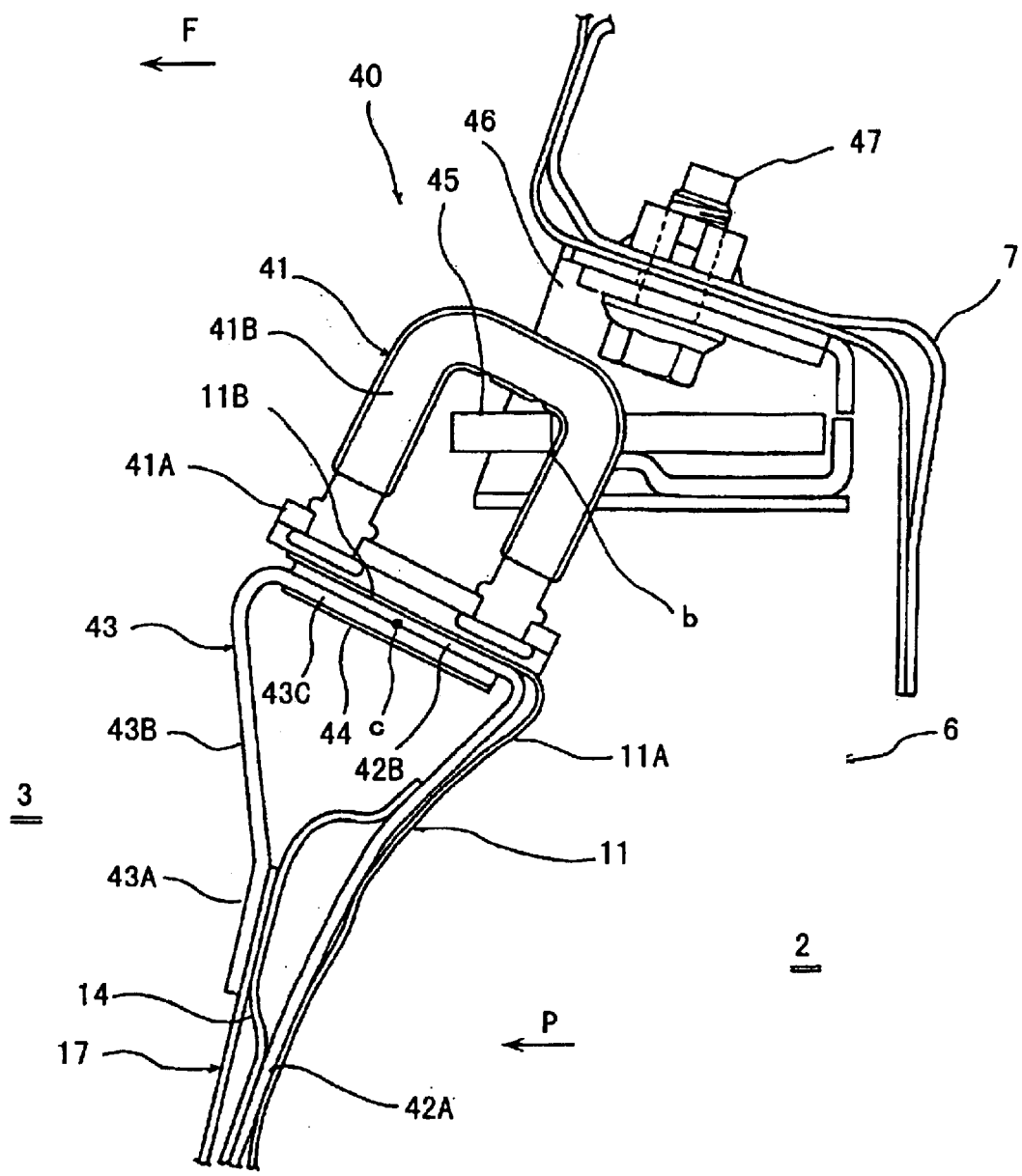
FIG. 11 is a schematic perspective view of a lock mechanism for use in the present invention when the lock mechanism is deformed.

The striker installation part 11B of the outer panel 11 the striker reinforcing member 42, and the striker bracket 43 form a closed space having a hollow cross section (FIGS. 6 and 11). Namely, the striker support part 40A has an improved rigidity. Since the striker is provided on the rigid striker support part 40A, the partition panel 10 can be maintained in a closed state by the rigid/stable engagement between the striker 41 and the latch 45.

When an excessively large impact load is applied to the partition panel 10 from the back, the upper part of the partition panel 10 is pushed in a forward direction, and a rotational force centering around an engaging point b of the striker element 41B and the latch 46 is applied to the striker 41. As a result, a tension load is applied to the striker installation parts 11B, 42B and 43C of the outer panel 11 and the striker reinforcing member 42 and the striker bracket 43 at a center portion c with respect to the lengthwise direction of the vehicle, where the striker 41 is connected by bolts. Then, a tension load is applied to a front part of the striker installation part 48C and the front surface 43B, and the impact energy is absorbed by the deformation of the striker bracket 43.

On the other hand, a downwardly directed force is applied to the rear part of the striker installation parts 11B, 42B and 43C when an impact load is applied thereto. Then, the upper center part of the outer panel 11 and the upper part of the striker bracket 42 are deformed, e.g., by crushing. Simultaneously, the upper inner panel 14 is also deformed. The impact energy is effectively absorbed by the deformation of the outer panel 11, the striker bracket 42, and the upper inner panel 14.

The function of the partition panel 10 will be further explained.

When the vehicle 1 is operated while carrying cargo W on the floor 4 of the cargo compartment 2, the cargo W can be moved in a forward direction to contact the partition panel 10, e.g., by a collision. In such case, impact load P is generated by the cargo W contacting the partition panel 10 and is conveyed from a trim board to the center reinforcing member 18, lower reinforcing members 19 and 21, and upper reinforcing members 20 and 22. Then, the impact load is distributed to the entire surface of the outer panel, that is, to the entire body of the partition panel 10.

Moreover, an impact load is distributed from the lower ends of the lower reinforcing members 19 and 21 to the lower inner panel 13 over the entire width, and from the lower ends of the center reinforcing member 18 and the center inner panel 17 to the lower inner panel 13. The load is conveyed to the previously mentioned closed part forming a hollow cross section (closed part) provided at a lower part of the partition panel 10. Then, the load is effectively transmitted to the floor 4 via the hinge mechanisms 30 connected to both ends of the partition panel 10. Finally, the impact load is distributed to the entire body of the vehicle 1.

An impact load is also distributed from the upper ends of the upper reinforcing members 20 and 22 to the upper inner panel 14 over the entire width. Then, the impact load is transmitted from the upper parts of the outer panel 11 and the partition panel 10 to the striker 41, and from the upper ends of the center reinforcing member 18 and the center inner panel 17 to the striker support part 40A. Finally, the impact load is effectively transmitted from the striker to vehicle body members, that is, to the entire body of the vehicle 1.

Accordingly, it is possible to distribute impact load P effectively to the entire body of the vehicle without applying a load locally to the partition panel 10, hinge mechanisms 30 and lock mechanism 40, so that deformation on the partition panel 10, hinge mechanisms 30 and lock mechanism 40 can be reduced.

Alternatively, when the vehicle 1 is operated while carrying cargo W on the floor 4 of the cargo compartment 2, the cargo W can be moved in a forward direction to contact the partition panel 10, e.g., by a frontal collision. In such case, impact load P is generated by the cargo W contact the partition panel 10 and is conveyed from a trim board to the center reinforcing member 18, lower reinforcing members 19 and 21, and upper reinforcing members 20 and 22. Then, the impact load is distributed to the entire body of the outer panel 11, that is, to the entire body of the partition panel 10.

Moreover, an impact load is distributed from the lower ends of the lower reinforcing members 19 and 21, the center reinforcing member 18 and the center inner panel 17 to the lower part of the outer panel 11 and the lower part of the partition panel 10 having a rigidity by the provision of the closed part. Then, the load is effectively transmitted to the floor 4 via the hinge mechanisms 30. On the other hand, an impact load is also transmitted from the upper reinforcing members 20 and 22 to the upper part of the outer panel 11 and to the striker 41 provided on the striker support part 40A with an improved rigidity. The load applied to the upper parts of the center reinforcing member 18 and the center inner panel 17 is transmitted to the striker support part 40A. Then, the load on the striker 41 is distributed to the entire body of the vehicle 1 via the latch 45.

As previously mentioned, the energy absorption part 12 for absorbing impact energy is prepared on the partition panel 10 at the lower center part. The energy absorption part 12 is less rigid since the outer panel 11 and the lower inner panel 13 are not welded thereto. When an excessively large impact load is applied to the vehicle 1, which cannot be distributed to the entire body of the vehicle 1 via the hinge mechanisms 40 and the lock mechanism 50, the energy absorption part 12 is pushed out in a forward direction and deformed by bending. Therefore, impact energy is absorbed.

As the lower center part of the partition panel 10 is forwardly pushed out, the center part of the lower inner panel 13 is forwardly pressed as shown by an imaginary line 13a in FIG. 8. In this state, the hinge bracket 32, which is, connected to the lower ends of the partition panel 10, is twisted by rotating in the direction shown by an arrow R in FIG. 8 on a point O linking the plate pin supporting part 31B and the bracket pin supporting part 32B.

FIG. 10 is a perspective view of a hinge mechanism 30 when the hinge mechanism 30 is deformed. The above-mentioned movement of the hinge pin 33 gives a torsional deformation of the bracket support part SIB. Namely, the impact energy is absorbed by torsional deformation of the hinge bracket 31.

FIG. 11 is perspective view of a lock mechanism when the lock mechanism is deformed.

When the upper part of the partition panel 10 is forwardly pressed by impact load P generated by the contact of the cargo W with the panel 10, a pivoting force around the point b where the striker part 41 and latch 45 engage with each other is applied to the striker 41. As a result, the center part c with respect to the lengthwise direction of the striker installation parts 11B, 42B and 43C receive an upward tension load. The striker bracket 43 is deformed as shown in FIG. 11, and the impact energy is absorbed by the deformation.

On the other hand, a downwardly directed force is applied to the rear region of the striker installation parts 11B, 42B and 43C. The upper center part of the outer panel 11 and the upper part of the striker reinforcing member 42 are crushed, and the upper inner panel 14 also deforms. In this way, the impact energy is absorbed by the deformation of the upper part of the partition structure.

Namely, an excessively large impact load is absorbed by bending deformation of the energy absorption part 12, distortion of the pin supporting part 31B of the hinge bracket 31, pulling up deformation of the striker bracket 43, crushing deformation of the upper part of the outer panel 11, and deformation of upper inner panel 14. In other words, an impact load is effectively distributed to many parts of the vehicle and absorbed. Furthermore, the partition panel 10 is prevented from intruding into the passenger compartment 3, and the safety is improved to a large extent.

According to the present invention, impact load P is dispersedly transmitted to the entire parts of the partition panel 10 through the reinforcing members 18, 19, 20 and 22, and the inner panels 13, 14, 15, 16 and 17 when the vehicle 1 receives an impact load from the front and cargo on the cargo compartment is forwardly moved to hit the partition panel 10. Furthermore, the impact load is transmitted to the floor 4 of the vehicle 1 via the hinge mechanisms 30, and to an entire body through the lock mechanism 40. Therefore, a local impact will not be applied to the partition panel 10, hinge mechanism 30 and lock mechanism 40, so that the deformation of the partition panel 10, hinge mechanism 30 and lock mechanism will be prevented.

On the other hand, when an excessively large load is applied to the partition panel 10, the impact energy is dispersedly absorbed by the deformation of the hinge mechanism 30, torsional deformation of the plate pin supporting part 31B, and deformation of the striker bracket 42 and striker reinforcing member 42, so that the local impact load is eased. In addition to the above, the intrusion of the partition panel 10 into the passenger compartment 3 is prevented, so that the safety on the vehicle in largely improved.

Because of the deformable structure of the partition panel 10, hinge mechanism 30 and the lock mechanism 50 or absorbing impact energy, it is possible to obtain rigidity without increasing the thickness of members constituting the partition panel 10, the hinge mechanism 30 and the lock mechanism 50 or without strengthening these members. Therefore, it is possible to avoid the weight increase of the partition panel 10, without decreasing the operational efficiency of the partition structure 5. This results in reducing the entire weight of the vehicle 1 and the manufacturing cost.

In addition to the above embodiments, it is possible to prepare a lower inner panel 13 with an energy absorption part 12 with a different configuration. For example, a lower inner panel 13 having an energy absorption part 12 at a lower center part of the lower inner panel 13 as a flat plate can be used. By decreasing a sectional modulus of the energy absorption part 12, energy is also satisfactorily absorbed at the absorption part 12.

Furthermore, it is possible to weld nuts to the hinge bracket 32 at parts corresponding to the pin receiving holes 32C. The hinge pin 33 is connected with the hinge bracket 32 by screwing the screw parts 33C of the hinge pins 33 to the nuts. In this case, threading of the pin receiving hole 32C can be omitted, Other structures and functions that may be disclosed in Japanese Patent Application 2001-397686, filed on Dec. 27, 2001 are hereby incorporated by reference into this application.

The present invention being thus described, it will be clearly understood that the same may be varied in many ways. Such variations are not to be regarded as a departure from the spirit and scope of the present invention, and all such modification as would be easily understood to one skilled in the art are intended to be included within the scope of the appended claims.

What is claimed is:

1. A partition structure for a vehicle having an opening provided between a passenger compartment and a cargo compartment, and a floor extending from the passenger compartment to the cargo compartment, comprising:
- a partition panel in a rectangular shape extending in a widthwise direction of the vehicle for opening and closing the opening;
- a pair of hinge mechanisms provided for connecting said partition panel with the floor, said hinge mechanisms supporting said partition panel so as to open said opening by lowering said partition panel and to close said opening by raising said partition panel; and
- a lock mechanism for supporting said partition panel in a closed state by engagement of an upper part of said partition panel with a vehicle body member, said partition panel having a low rigidity energy absorption part provided at a lower center part of said partition panel, said low rigidity energy absorption part representing a lower rigidity portion of said partition panel.

2. The partition structure as claimed in claim 1, wherein said partition panel comprises an outer panel approximately in a rectangular shape for fitting into said opening, and a lower inner panel extending along a lower edge of said outer panel by being welded to said outer panel, a center part of said lower inner panel with respect to a widthwise direction of the vehicle being free of welding.

3. The partition structure as claimed in claim 2, wherein said lower inner panel and said outer panel provide a configuration having a hollow cross section and extending in a widthwise direction.

4. The partition structure as claimed in claim 1, wherein said partition panel comprises an outer panel approximately in a rectangular shape for fitting into said opening, an upper inner panel being connected to an upper edge of said outer panel, said upper inner panel and said outer panel providing a configuration having a hollow cross section and extending in a widthwise direction, a lower inner panel welded with a lower edge of said outer panel to provide a configuration having a hollow cross section and extending in a widthwise direction, said lower inner panel having a center part that is free of welding, a pair of side inner panels extending along lateral sides of said outer panel, lower ends of said side inner panels being connected to said lower inner panel, upper ends of said side inner panels being connected to said upper inner panel, and a center inner panel vertically provided at a center of said outer panel, and an upper end and a lower end of said center inner panel being respectively connected to said upper inner panel and said lower inner panel.

5. The partition structure as claimed in claim 2, wherein both ends of said lower inner panel are respectively connected to said hinge mechanisms.

6. The partition structure as claimed in claim 4, wherein said partition panel comprises a center reinforcing member, said center reinforcing member welded to said outer panel to provide a configuration having a hollow cross section and extending in a vertical direction, lower reinforcing members extending in a widthwise direction between said center reinforcing member and said side inner panels having a predetermined distance from said center reinforcing member, said lower reinforcing members and said outer panel providing a configuration having a hollow cross section and extending in a widthwise direction, lower ends of said lower reinforcing members being connected to said lower inner panel, upper reinforcing members extending an a widthwise direction of the vehicle between said center reinforcing member and said side inner panels having a predetermined distance from said center reinforcing member, said upper reinforcing members and said outer panel providing a configuration having a hollow cross section and extending in a widthwise direction, upper ends of said lower reinforcing members being connected to said upper inner panel.

7. The partition structure of claim 1 wherein said partition panel comprises an outer panel, which is configured to fit into said opening, and a lower inner panel having a hollow cross-section and extending in a widthwise direction, and said lower inner panel being welded to said outer panel except for a center part of said lower inner panel, which center part is free of a weld connection with said outer panel.

8. The partition structure of claim 7 wherein said partition panel comprises an upper inner panel having a hollow cross-section and extending in a widthwise direction, and said upper inner panel being welded to said outer panel except for a center part of said upper inner panel which center part is free of a weld to said outer panel.

9. The partition structure of claim 8 further comprising a center inner panel which is positioned at a center part of the outer panel and has a first end welded to said upper inner panel and a second, opposite end welded to said lower inner panel.

10. The partition structure of claim 9, wherein said center, inner panel is provided on a front surface of said outer panel, and said partition panel farther comprising a center reinforcing member provided on a rear surface of said outer panel and said center reinforcing member being welded to the rear surface of said outer panel.

11. The partition structure of claim 10 further comprising first and second horizontally extending reinforcing members provided on the rear surface of said outer panel to opposite sides of said center reinforcing member and spaced from said center reinforcing member.

12. The partition structure of claim 11 further comprising first and second side inner panels extending parallel with said center inner panel and each of said side inner panels having an upper end welded to said upper inner panel and a lower end welded to said lower inner panel.

13. The partition structure of claim 1 wherein said partition panel comprises an outer panel configured to fit into said opening and an upper inner panel having a hollow cross-section and extending in a widthwise direction; and said upper inner panel being welded to said outer panel except for a center part of said upper inner panel.

* * * * *